(12) United States Patent
Shiraishi (10) Patent No.: US 7,072,537 B1
(45) Date of Patent: Jul. 4, 2006

(54) OPTICAL SWITCH

(75) Inventor: Takashi Shiraishi, Kawasaki (JP)

(73) Assignee: Fujitsu Limited, Kanagawa (JP)

( * ) Notice: Subject to any disclaimer, the term of this patent is extended or adjusted under 35 U.S.C. 154(b) by 0 days.

(21) Appl. No.: 11/282,686

(22) Filed: Nov. 21, 2005

(30) Foreign Application Priority Data

Aug. 9, 2005 (JP) .............................. 2005-230343

(51) Int. Cl.
    *G02B 6/26* (2006.01)
    *G02B 6/42* (2006.01)

(52) U.S. Cl. .............................. 385/16; 385/9; 385/20; 385/40

(58) Field of Classification Search .................... 385/9, 385/16, 20, 40
See application file for complete search history.

(56) References Cited

U.S. PATENT DOCUMENTS

| 6,778,726 B1* | 8/2004 | Kato et al. .................... 385/16 |
| 6,819,818 B1* | 11/2004 | Aoki ........................... 385/16 |
| 6,823,097 B1* | 11/2004 | Glebov et al. ................ 385/16 |
| 2003/0152329 A1* | 8/2003 | Sugama et al. ............... 385/50 |

FOREIGN PATENT DOCUMENTS

| JP | 11-24021 | 1/1999 |
| JP | 2000-180905 | 6/2000 |
| JP | 2003-280053 | 10/2003 |
| JP | 2004-20718 | 1/2004 |
| JP | 2004-191874 | 7/2004 |

OTHER PUBLICATIONS

Chen, Qibiao, et al. "Guided-Wave Electro-Optic Beam Deflector Using Domain Reversal in LiTaO$_3$." J. of Lightwave Technology, vol. 12, No. 8, Aug. 1994, pp. 1401-1404.
Sugama, Akio et al. "Electro-Optic Beam-Deflection Switch for Photonic Burst Switching." 2 pgs.
Nashimoto, Keiichi. "Epitaxial PLZT Waveguide Technologies for Integrated Photonics." 10 pgs.

\* cited by examiner

*Primary Examiner*—Kaveh Kianni
*Assistant Examiner*—Derek L. Dupuis
(74) *Attorney, Agent, or Firm*—Bingham McCutchen LLP

(57) ABSTRACT

An optical switch of the present invention is for deflecting a light given to an input channel waveguide by first and second optical deflecting sections arranged respectively on the former and latter stages of a slab type optical waveguide section, so that a deflection angle by the first optical deflecting section is symmetrical to that by the second optical deflecting section, to guide the light to a desired output channel waveguide. The first and second optical deflecting sections each includes a half-wave plate between input side upper electrode portions and output side upper electrode portions each of which is formed with prism type electrodes, and the slab type optical waveguide also includes a half-wave plate on the center thereof. As a result, by forming an optical deflection element using a material having the polarization dependence and a high electro-optic effect, it becomes possible to achieve the reduction of drive voltage and an increase of deflection angle, and also, to reduce a loss occurred due to the polarization dependence of the deflection angle.

12 Claims, 5 Drawing Sheets

A-A' CROSS SECTION

OPTICAL SWITCH

BACKGROUND OF THE INVENTION

1. Field of the Invention

The present invention relates to an optical switch for switching paths between input channel waveguides and output channel waveguides, utilizing the deflection of optical beams.

2. Description of the Related Art

In recent years, the transmission band of optical communication has been enlarged, and the speeding up and large capacity thereof has been developed combined with the wavelength division multiplexing (WDM) technology. In order to construct hardware infrastructures of optical fiber network in a backbone communication network, an optical switch for switching transmission determinations of optical signals is required.

As a conventional optical switch, there has been known an optical switch utilizing a movable micro-mirror. Further, in order to further develop the high integration and high-speed of the optical switch, the development of optical switches utilizing a change in the refractive index due to an electro-optic effect of ferroelectric substance has been progressed. As one of the optical switches utilizing this electro-optic effect, there is the one having a configuration in which an optical deflection element is disposed between an input port and a plurality of output ports, and a traveling direction of a light which is given to the input port is deflected by the optical deflection element, thereby guiding the light to the desired output port. As a specific example, there has been proposed an optical switch for deflecting a light by a prism type domain reversal optical deflection element or a prism type electrode optical deflection element, utilizing a lithium niobate (LiNbO$_3$) single crystal wafer on which titanium (Ti) diffusion type waveguides or proton exchange type waveguides are formed (refer to the literature: "Guided-Wave Electro-Optic Beam Deflector Using Domain Reversal in LiTaO$_3$" by Q. Chen et al., Journal of Lightwave Tech., Vol. 12, pp. 1401–1404, 1994).

As a specific configuration of the optical switch utilizing the electro-optic effect as described above, as shown in FIG. 6 for example, there has been known the one comprising an optical input section 110, a collimate section 120, a first optical deflecting section 130, a slab type optical waveguide section 140, a second optical deflecting section 150, an optical condensing section 160 and an optical output section 170 (refer to Japanese Unexamined Patent Publication No. 2000-180905 and the literature: "Electro-Optic Beam Deflection Switch for Photonic Burst Switching" by A. Sugama et al., ECOC 2004, No. 4.6.3 (2004)). In the optical switch of FIG. 6, a light input to each of input channel waveguides Cin1 to Cin4 in the optical input section 110 is converted into a parallel light by each of collimate lenses 121 corresponding to the input channel waveguides Cin1 to Cin4, in the collimate section 120, and thereafter, is deflected by the first optical deflecting section 130 including prism type electrodes 131, according to a position of a desired one of output channel waveguides Cout1 to Cout4, to be transmitted through the slab type optical waveguide section 140 toward the second optical deflecting section 150. Then, the light incident on the second optical deflecting section 150 including prism type electrodes 151 is again deflected, and thereafter, is condensed on one point by a condenser lens 161 corresponding to the desired output channel waveguide, in the optical condensing section 160, to be guided to the desired one of the output channel waveguides Cout1 to Cout4.

Further, typically, since optical signals transmitted through an optical fiber have random polarization planes, an optical switch used for an optical communication system is required to be polarization independence. In order to meet this requirement, as shown in FIG. 7 for example, there has been proposed an optical switch in which a half-wave plate 141 is disposed on the center of the slab type optical waveguide section 140 in the conventional configuration example shown in FIG. 6 (refer to Japanese Unexamined Patent Publication No. 2003-280053). In the optical switch shown in FIG. 7, a polarization plane of a light being propagated through the slab type optical waveguide section 140 is rotated by 90° by the half-wave plate 141. As a result, a TE mode and a TM mode are converted into each other, and the deviation on the time base between the TE mode and the TM mode, which occurs on the former half of the slab type optical waveguide section 140, is offset on the latter half of the slab type optical waveguide section 140, so that polarization mode dispersion (PMD) occurring within the optical switch is compensated.

According to the conventional optical switch utilizing the electro-optic effect as described above, by using a material having the high electro-optic effect for the first and second optical deflecting sections 130 and 150, it becomes possible to reduce drive voltages applied to the prism type electrodes 131 and 151, and to achieve an increase of deflection angle in each of the first and second optical deflecting sections 130 and 150. However, in the case where the material having the high electro-optic effect is used, since the polarization dependence of the deflection angle becomes prominent, there is a problem in that a loss of the light which is guided to the desired output channel waveguide is increased.

Here, there will be described in detail the polarization dependence of the deflection angle.

A deflection angle of an optical deflection element utilizing the electro-optic effect depends on a change in the refractive index due to the electro-optic effect. To be specific, when the electric field E generated by the prism type electrode is added to the material having the electro-optic effect, refractive index "n" of the material is changed. A change Δn of this refractive index can be expressed in the following formula (1), if a primary electro-optic effect (Pockels effect) acts.

$$\Delta n = -\tfrac{1}{2} \cdot n^3 \cdot r \cdot E \qquad (1)$$

In the above formula, "r" is an electro-optic constant.

In the case of using orientations of large electro-optic constant, it is typically known that electro-optic constant "r" and refractive index "n" of the ferroelectric substance each has the polarization dependence in each orientation. For example, in the case where LiNbO$_3$ of z-cut is used as the electro-optic material, electro-optic constant $r_{33}$ corresponding to the TM mode is 0.8 pm/V and electro-optic constant $r_{13}$ corresponding to the TE mode is 8.6 pm/V, and also, refractive index $n_{Tm}$ corresponding to the TM mode is 2.14 and refractive index $n_{TE}$ corresponding to the TE mode is 2.2.

Figure 6:
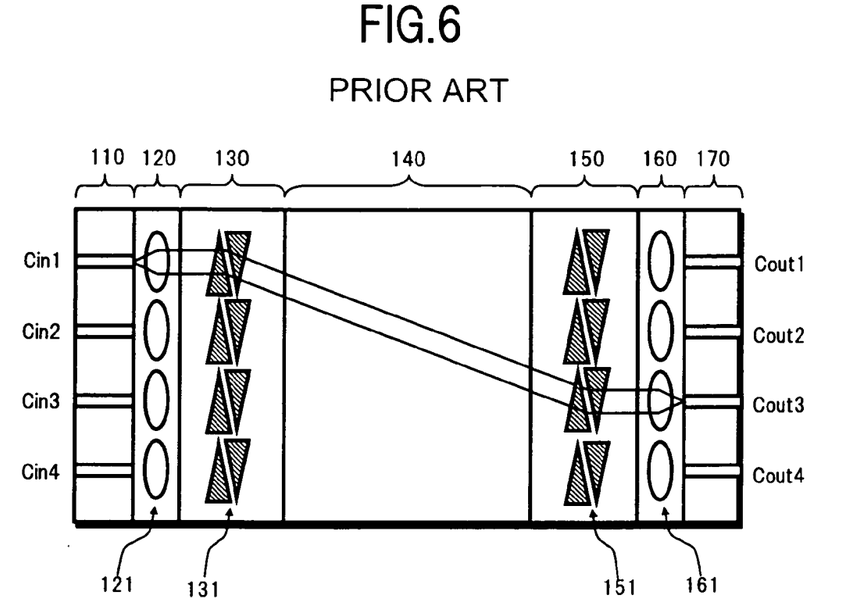
FIG. 6 is a top view showing a configuration example of a conventional optical switch utilizing an electro-optic effect.
Figure 7:
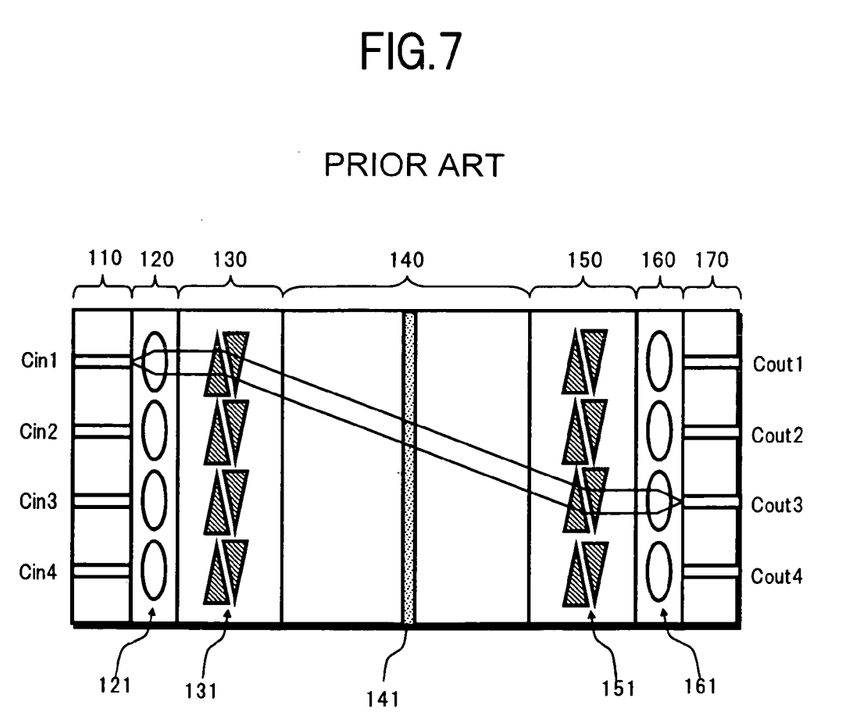
FIG. 7 is a top view showing another configuration example of the conventional optical switch utilizing an electro-optic effect.
Figure 8:
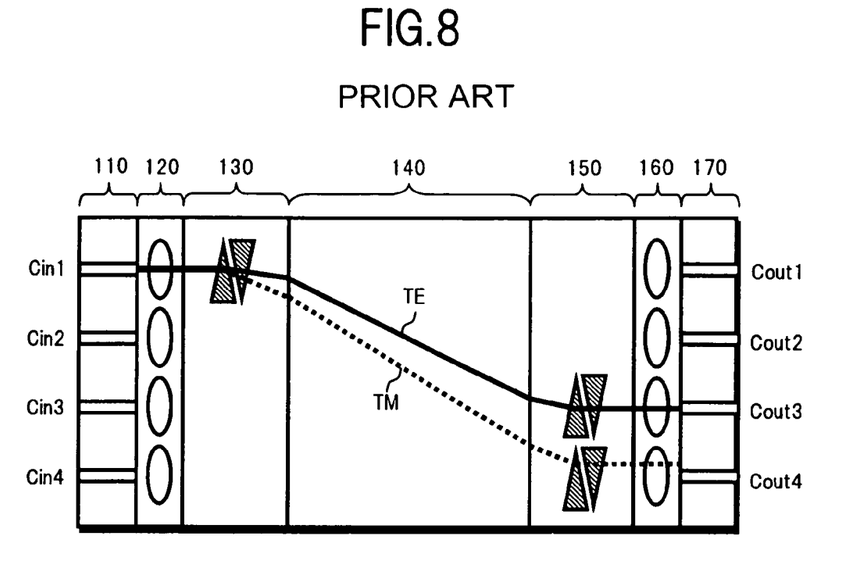
FIG. 8 is a diagram for explaining an operation in the case where a ferroelectric substance is used for the configuration example in FIG. 6.

In the optical switch of the configuration as shown in FIG. 6, in the case where the ferroelectric substance such as LiNbO$_3$ or the like is used as the material of the first and second optical deflecting sections 130 and 150, due to the polarization dependence of electro-optic constant "r" and of refractive index "n" as described above, as shown in FIG. 8 for example, the deviation occurs between the deflection angle to the TE mode light (solid line) and the deflection angle to the TM mode light (broken line). Due to this deviation between the deflection angles, the TM mode light in the light given to the input channel waveguide Cin1 reaches a position deviated from the desired output channel waveguide Cout3. Therefore, a loss of the light which is guided from the input channel waveguide Cin1 to the output channel waveguide Cout3 is increased.

Figure 9:
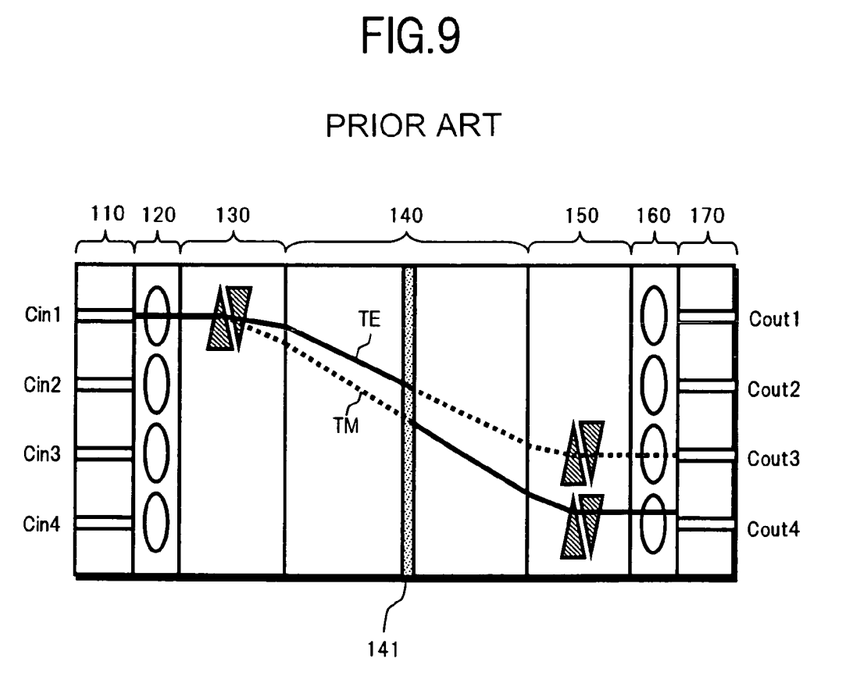
FIG. 9 is a diagram for explaining an operation in the case where a ferroelectric substance is used for the configuration example in FIG. 7.

Further, in the optical switch in which the half-wave plate 141 is disposed on the center of the slab type optical waveguide section 140 as shown in FIG. 7, in the case where the ferroelectric substance is used as the material of the first and second optical deflecting sections 130 and 150, although the polarization dependence on the time base can be resolved by the half-wave plate 141, it is impossible to compensate for the deviation between the deflection angles based on the polarization dependence of electro-optic constant "r" and of refractive index "n", as shown in FIG. 9 for example. Therefore, similarly to the case shown in FIG. 8, the loss of the light which is guided to the desired output channel waveguide is increased.

Incidentally, in the conventional optical switch shown in FIG. 6 or FIG. 7, since the electro-optic material without the polarization dependence has been basically used as the material of the first and second optical deflecting sections 130 and 150, the polarization dependence of the deflection angle as described above has not been problematic. To be specific, it is known that PLZT of epitaxial growth ($Pb_{1-x}La_x(Zr_yTi_{1-y})_{1-x/4}O_3$) has the polarization independence depending on the composition thereof (refer to the literature: "Epitaxial PLZT Waveguide Technologies for Integrated Photonics" by K. Nashimoto, Integrated Photonics Devices, Materials, and Technologies IX, Photonics West 2005 (Invited paper)). Such an electro-optic material with the polarization independence has been applied to the conventional optical switch. However, the material with the polarization independence such as PLZT of epitaxial growth has the electro-optic constant smaller than that of an electro-optic material with the polarization dependence (for example, bulk SBN ($Sr_{0.75}Ba_{0.25}Nb_2O_6$)). In order to further reduce the drive voltage for the optical switch and to realize the larger deflection angle, it is desired to configure the first and second optical deflecting sections 130 and 150 using the electro-optic material with the polarization dependence as described above.

SUMMARY OF THE INVENTION

The present invention has been accomplished in view of the above problems and has an object to provide an optical switch capable of achieving the reduction of drive voltage and an increase of a deflection angle by forming optical deflection elements using a material having the polarization dependence and a large electro-optic constant, and also, capable of reducing a loss which occurs due to the polarization dependence of the deflection angle.

In order to achieve the above object, an optical switch according to the present invention comprises: at least one input channel waveguide and a plurality of output channel waveguides; a first optical deflecting unit which deflects a light input to the input channel waveguide; a slab type optical waveguide unit through which the light deflected by the first optical deflecting unit is propagated; and a second optical deflecting unit which deflects the light passed through the slab type optical waveguide unit at a deflection angle symmetrical to that by the first optical deflecting unit, to guide the light to one output channel waveguide selected from the plurality of output channel waveguides. The first optical deflecting unit and second optical deflecting unit in the optical switch each includes: a slab type optical waveguide formed by using a material having the polarization dependence and an electro-optic effect; input side upper electrode portions each of which is formed with at least one prism type electrode on a position of the optical input side on the top surface of the slab type optical waveguide; output side upper electrode portions each of which is formed with at least one prism type electrode on a position of the optical output side on the top surface of the slab type optical waveguide; a lower electrode formed on the bottom surface of the slab type optical waveguide; a drive circuit which applies voltages to the input side upper electrode portions and the output side upper electrode portions, to generate substantially equal electric fields between the input side upper electrode portions and the lower electrode, and between the output side upper electrode portions and the lower electrode; and a mode conversion element which performs the inter-conversion between TE/TM modes of the light being propagated through the slab type optical waveguide positioned between the input side upper electrode portions and the output side upper electrode portions.

In the optical switch of the configuration as described above, the light input to the input channel waveguide is given to the first optical deflecting unit to be propagated within the slab type optical waveguide. To this slab type optical waveguide, the input side upper electrode portions and the output side upper electrode portions are disposed on the top surface thereof, and the lower electrode is disposed on the bottom surface thereof. When the light passes below the input side upper electrode portion, the respective lights of TE/TM modes are deflected at different angles due to the electro-optic effect based on the electric field generated between the input side upper electrode portion and the lower electrode by the application of voltage from the drive circuit. Then, the deflected lights pass through the mode conversion element to be subjected to the TE/TM mode conversion, and further, the inter-converted lights of TE/TM modes are deflected at different angles, in the same manner as that in the input side, when passing through the underside of the output side upper electrode portion. Thus, traveling directions of the respective lights of TE/TM modes output from the first optical deflecting unit to the slab type optical waveguide unit are made parallel to each other. The respective lights of TE/TM modes which have traveled straight in the slab type optical waveguide unit while maintaining the parallel state thereof, are given to the second optical deflecting unit to be propagated within the slab type optical waveguide, and pass through sequentially the underside of the input side upper electrode portion, the mode conversion element, and the underside of the output side upper electrode portion, to be deflected at angles symmetrical to those by the first optical deflecting unit. As a result, the respective lights of TE/TM modes travel through a substantially coincident position to the same direction, to be guided to one output channel waveguide selected from the plurality of output channel waveguides.

According to the optical switch of the present invention as described in the above, the first and second optical deflecting unit are formed by using the material having the polarization dependence and the high electro-optic effect, and even in the case of achieving the reduction of drive voltage and the increase of deflection angle, the mode conversion element is arranged between the input side upper electrode portions and the output side upper electrode portions for each of the first and second optical deflecting unit, so that the polarization dependence of the deflection angle in each of the first and second optical deflecting unit can be substantially eliminated. Therefore, it is possible to guide the light given to the input channel waveguide to the desired output channel waveguide at a low loss. Thus, it is possible to provide an optical switch of low loss in which a large deflection angle can be achieved even at low drive voltages.

The other objects, features and advantages of the present invention will be apparent from the following description of the embodiments with reference to the accompanying drawings.

DETAILED DESCRIPTION OF THE INVENTION

Hereinafter, embodiments of the present invention will be described with reference to drawings. The same reference numerals denote the same or equivalent parts in all drawings.

Figure 1:
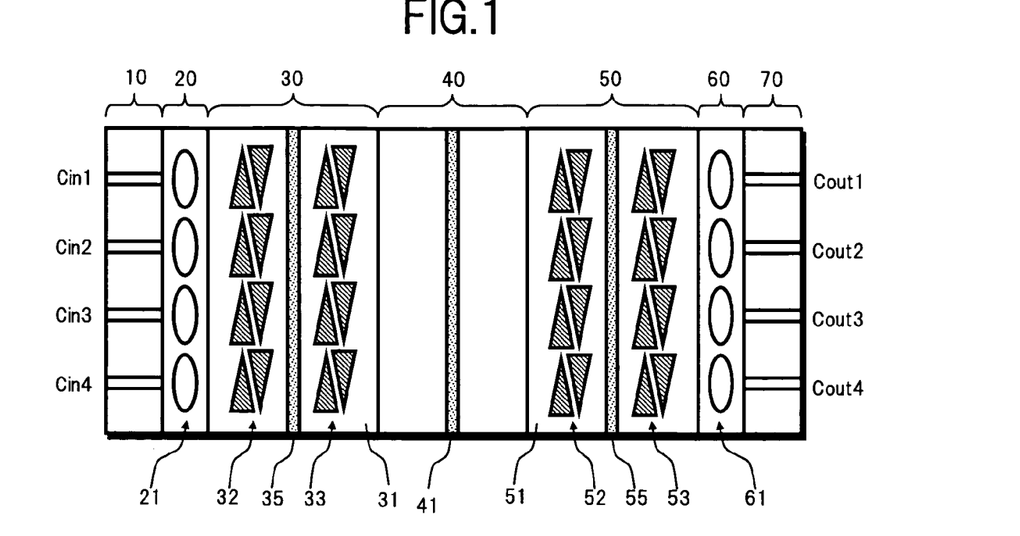
FIG. 1 is a top view showing a configuration of one embodiment of an optical switch according to the present invention.

FIG. 1 is a top view showing a configuration of an optical switch according to the present invention.

In FIG. 1, the present optical switch comprises, for example: an optical input section 10; a collimate section 20; a first optical deflecting section 30 as first optical deflecting unit; a slab type optical waveguide section 40 as slab type optical waveguide unit; a second optical deflecting section 50 as second optical deflecting unit; an optical condensing section 60; and an optical output section 70.

The optical input section 10 is made up by forming a plurality (here, four, for example) of input channel waveguides Cin1 to Cin4 on a typical optical substrate. A light whose determination is switched by the present optical switch is incident on one end of each of the input channel waveguides Cin1 to Cin4. Note, the light to each of the input channel waveguides Cin1 to Cin4 may be a light of single wavelength or a WDM light containing plural wavelengths.

The collimate section 20 includes collimate lenses 21 respectively corresponding to the respective input channel waveguides Cin1 to Cin4 of the optical input section 10, and converts the light radiated from the other end of each of the input channel waveguides Cin1 to Cin4 into a parallel light, to give the parallel light to the first optical deflecting section 30. Each collimate lens 21 may be realized by forming, for example, a thin-film lens or the like on the optical substrate on which the respective input channel waveguides Cin1 to Cin4 are formed. According to such a configuration, it becomes possible to integrate the optical input section 10 and the collimate section 20 with each other.

Figure 2:
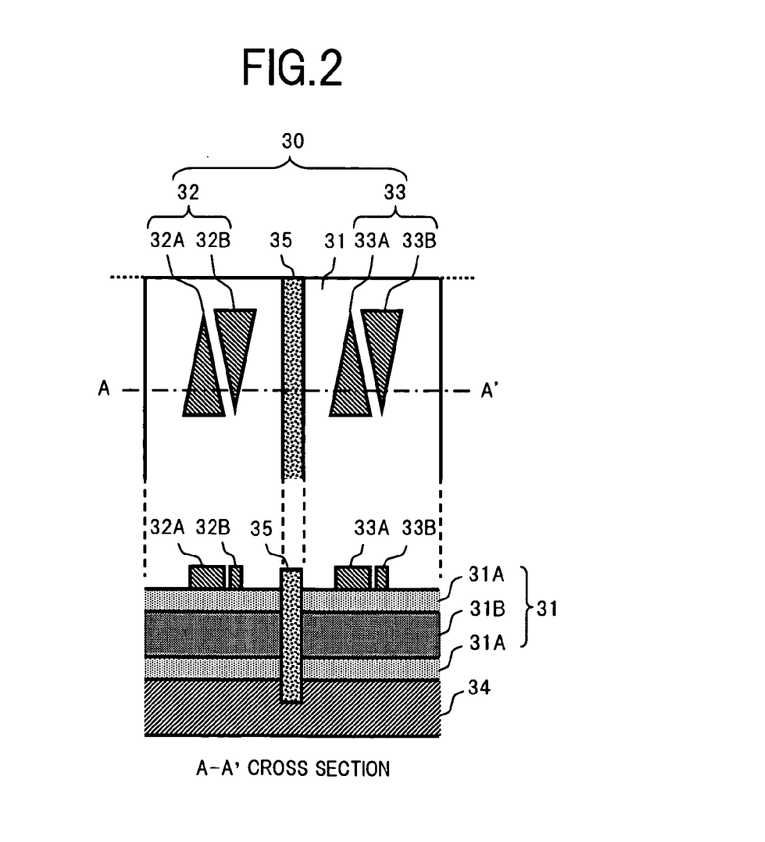
FIG. 2 shows a top view and a cross section of a specific configuration of a first optical deflecting section in the embodiment.

As shown in an enlarged top view (upper stage) and an A–A' cross section (lower stage) of FIG. 2 for example, the first optical deflecting section 30 includes: a slab type optical waveguide 31 formed by using a material having the polarization dependence and an high electro-optic effect; input side upper electrode portions 32 and output side upper electrode portions 33 which are formed on the surface of the slab type optical waveguide 31 so as to correspond to the respective collimate lenses 21 of the collimate section 20; a lower electrode 34 formed on the entire rear face of the slab type optical waveguide 31; and a half-wave plate 35 inserted onto the slab type optical waveguide 31 positioned between the input side upper electrode portions 32 and the output side upper electrode portions 33.

To be specific, the slab type optical waveguide 31 is configured by forming a core layer 31B whose top and bottom surfaces are covered by a clad layer 31A on bulk SBN ($Sr_{0.75}Ba_{0.25}Nb_2O_6$) (refer to the lower stage of FIG. 2). According to this slab type optical waveguide 31, it is possible that the parallel light emitted from the collimate section 20 is freely propagated within the core layer 31B to a two-dimensional direction along the substrate surface. Here, one example using SBN is shown. However, the electro-optical material applicable to the optical deflecting sections in the present invention is not limited to the above example. A material of BSTN ($Ba_{1-x}Sr_xTi_yNb_{2-y}O_6$) BNN ($Ba_2NaNbO_5$) or the like has a relatively large electro-optic constant, and therefore, is applicable as the electro-optic material used for the optical deflecting sections in the present invention.

The input side upper electrode portions 32 corresponding to the four collimate lenses 21 each consists of a set of prism type electrodes 32A and 32B, for example. A voltage supplied from a drive circuit (not shown in the figure) is commonly applied to the prism type electrodes 32A and 32B. Further, similarly to the input side upper electrode portions 32, the output side upper electrode portions 33 each consists of a set of prism type electrodes 33A and 33B to which the voltage is commonly applied from the drive circuit. The lower electrode 34 generates an electric field $E_{32}$ within the slab type optical waveguide 31 positioned between the lower electrode 34 and the respective input side upper electrode portions 32 to which the voltage is applied from the drive circuit, and also generates an electric field $E_{33}$ within the slab type optical waveguide 32 positioned between the lower electrode 34 and the respective output side upper electrode portions 33 to which the voltage is applied from the drive circuit.

Here, one example is shown in which each of the input side upper electrode portions 32 and each of the output side upper electrode portions 33 are configured, respectively, by the set of prism type electrodes 32A and 32B, and the set of prism type electrodes 33A and 33B. However, the number of prism type electrodes in each upper electrode portion can be arbitrarily set. In the case where the number of prism type electrodes is different for each upper electrode portion, the drive voltage applied to each upper electrode portion is adjusted so that the electric field $E_{32}$ is substantially coincident with the electric field $E_{33}$. Namely, the number of prism type electrodes in each upper electrode portion and the drive voltage are set, so that deflection angles in the input and output side upper electrode portions are substantially equal to each other.

The half-wave plate 35 is embedded in, for example, a groove which is formed to cross over the slab type optical waveguide 31 positioned between the input side upper electrode portions 32 and the output side upper electrode portions 33 (refer to the lower stage of FIG. 2), and rotates a polarization plane of the light being propagated through the slab type optical waveguide 31 by 90°, to perform the inter-conversion between a TE mode and a TM mode. The clearance between the groove and the half-wave plate 35 is filled with the adhesive transparent to the light being propagated through the slab type optical waveguide 31. Note, herein, the TE/TM modes are inter-converted by the half-wave plate 35. However, a function equivalent to the half-wave plate 35 may be realized, for example, by combining two quarter-wave plates, using a Faraday rotator, and so on.

The slab type optical waveguide section 40 (FIG. 1) is configured by forming a core layer whose top and bottom surfaces are covered by a clad layer (not in the figure) on a typical optical substrate (whether or not the optical substrate has the electro-optic effect is not problematic), and the light deflected by the first optical deflecting section 30 can be freely propagated within the core layer to a two-dimensional direction along the substrate surface. A half-wave plate 41 is disposed on the center of the slab type optical waveguide section 40, and the TE mode and TM mode of the light being propagated through the slab type optical waveguide section 40 from the first optical deflecting section 30 toward the second optical deflecting section, are subjected to the inter-conversion. Similarly to the half-wave plate 35 of the first optical deflecting section 30, the half-wave plate 41 is embedded in a groove formed to cross over the slab type optical waveguide section 40, and the transparent adhesive is filled in the clearance between the groove and the half-wave plate 41.

The second optical deflecting section 50, similarly to the first optical deflecting section 30, includes a slab type optical waveguide 51, input side upper electrode portions 52, output side upper electrode portions 53, a lower electrode 54 and a half-wave plate 55. Note, these constitutional elements are the same as the corresponding constitutional elements in the first optical deflecting section 30, and therefore, the description thereof is omitted here.

The optical condensing section 60 includes condenser lenses 61 respectively corresponding to output channel waveguides Cout1 to Cout4 (to be described later) of the optical output section 70, and condenses the light output from the second optical deflecting section 50 on one point by each condenser lens 61, to give the condensed light to the optical output section 70. Each condenser lens 61 may be realized, for example, by forming a thin-film lens or the like on the optical substrate of the optical output section 70. According to such a configuration, it becomes possible to integrate the optical condensing section 60 and the optical output section 70 with each other.

The optical output section 70 is made up by forming a plurality (here, four, for example) of output channel waveguides Cout1 to Cout4 on a typical optical substrate. The light condensed on one point by each of the condenser lenses 61 of the optical condensing section 60 is given to one end of each of the output channel waveguides Cout1 to Cout4.

Next, there will be described an operation of the optical switch provided with the above configuration.

Figure 3:
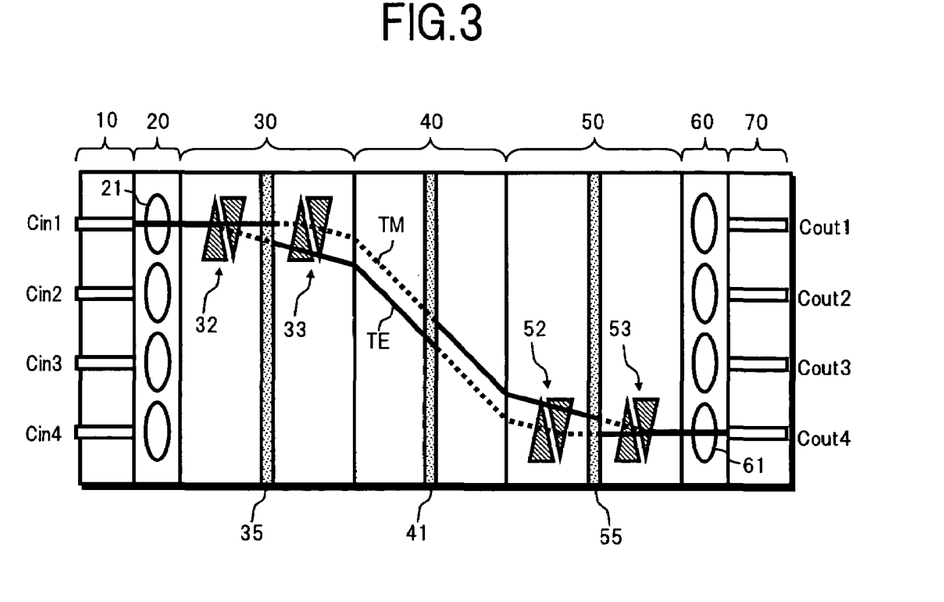
FIG. 3 is a diagram for explaining an operation of the embodiment.

Here, as shown in FIG. 3 for example, the operation of the optical switch will be specifically described, assuming the case where the light input to the input channel waveguide Cin1 is guided to the output channel waveguide Cout4. Incidentally, the operation of the optical switch in the case where the light input to the input channel waveguide Cin1 is guided to any one of the output channel waveguides Cout1 to Cout3 or in the case where the light input to any one of the other input channel waveguides Cin2 to Cin4 is guided to any one of the output channel waveguides Cout1 to Cout4, can be considered similarly to the following description, and therefore, the description thereof is omitted here.

The light input to the input channel waveguide Cin1 of the optical input section 10 is converted into a parallel light by the collimate lens 21 which corresponds to the input channel waveguide Cin1, in the collimate section 20, and thereafter, is sent to the first optical deflecting section 30. The light reached the first optical deflecting section 30 travels straight within the slab type optical waveguide 31, to pass through the underside of the input side upper electrode portion 32. A drive current set according to a position of the output channel waveguide Cout4 is applied to the input side upper electrode portion 32. By the application of the drive voltage to the input side upper electrode portion 32, the electric field $E_{32}$ is generated within the slab type optical waveguide 31 between the input side upper electrode portion 32 and the lower electrode 34. Due to the electro-optic effect by the electric field $E_{32}$, the refractive index of the slab type optical waveguide 31 is changed, so that the light being propagated within the slab type waveguide 31 is deflected.

For the deflection angle of the light due to the electric field $E_{32}$ in the input side upper electrode portion 32, since an electro-optic constant "r" and the refractive index "n" of SBN used for the slab type optical waveguide 31 have the polarization dependence, the deviation occurs between the deflection angle to the TE mode light and the deflection angle to the TM mode light. Therefore, the TE mode light (solid line) and the TM mode light (broken line) of the light which passed through the underside of the input side upper electrode portion 32, are propagated to different directions as shown in FIG. 3.

Then, the respective lights of TE/TM modes being propagated within the slab type optical waveguide 31 to the different directions are subjected to the mode-conversion when passing through the half-wave plate 35, so that the TE mode light is converted into the TM mode light, and the TM mode light is converted into the TE mode light. The respective lights of TM/TE modes are deflected when passing through the underside of the output side upper electrode portion 33, in the same manner as the time when passed through the underside of the input side upper electrode portion 32. As a result, propagation directions of the TM mode light and of the TE mode light become parallel to each other, and the respective lights of TM/TE modes are sent to the slab type optical waveguide section 40.

The respective lights of TM/TE modes incident on the slab type optical waveguide section 40 travel straight while maintaining the parallel state thereof, and are subjected to the mode-conversion when passing through the half-wave plate 41 disposed on the center of the slab type optical waveguide section 40, so that the TM mode light is converted into the TE mode light, and the TE mode light is converted into the TM mode light. Thus, the deviation on the time base between the TM/TE modes occurred in the former half of the slab type optical waveguide section 40 is offset in the latter half of the slab type optical waveguide section 40, and thereby, the polarization mode dispersion (PMD) is compensated. The respective lights of TE/TM modes propagated through the slab type optical waveguide section 40 is sent to the second optical deflecting section 50.

The respective lights of TE/TM modes reached the second optical deflecting section 50 are deflected when passing through the underside of the input side upper electrode portion 52, at angles symmetrical to those at the time when propagated through the first optical deflecting section 30, to be propagated so that the TE mode light and the TM mode light approach to each other. Then, the respective lights of TE/TM modes are subjected to the mode-conversion when passing through the half-wave plate 55, so that the TE mode light is converted into the TM mode light, and the TM mode light is converted into the TE mode light. The respective lights of TM/TE modes passed through the half-wave plate 55 are further deflected when passing through the underside of the output side upper electrode portion 53, to become the lights traveling straight to the same direction, thereby being sent to the optical condensing section 60. The lights reached the optical condensing section 60 are condensed on one point by the condenser lens 61 corresponding to the output channel waveguide Cout4, to be guided to the one end of the output channel waveguide Cout4.

As described in the above, according to the optical switch in the present embodiment, even in the case where the first optical deflecting section 30 and the second optical deflecting section 50 are formed by using the material of bulk SBN or the like having the polarization dependence and the high electro-optic effect, to achieve the reduction of drive voltage and an increase of deflection angle, the half-wave plates 35 and 55 are arranged respectively between the input side upper electrode portions 32 and the output side upper electrode portions 33, and between the input side upper electrode portions 52 and the output side upper electrode portions 53, so that the polarization dependence of the deflection angle in each of the first optical deflecting section 30 and the second optical deflecting section 50 can be eliminated. Therefore, it is possible to guide the light given to each of the input channel waveguides Cin1 to Cin4 to the desired one of the output channel waveguides Cout1 to Cout4. Further, since the half-wave plate 41 is disposed on the center of the slab type optical waveguide section 40, it is possible to compensate for the deviation on the time base between the TE/TM mode lights being propagated through the slab type optical waveguide section 40. Thus, it becomes possible to realize the optical switch of low loss and polarization independence by which the large deflection angle can be achieved even at the low drive voltage.

The next table 1 shows one example in which the reduction effect of drive voltage as a result that the optical deflecting sections are formed by using the material with the high electro-optic effect, is compared for each electro-optic material.

TABLE 1

| Electro-optic material | $r_{33}$ (pm/V) | $r_{13}$ (pm/V) | Drive current ratio |
|---|---|---|---|
| SBN | 1340 | 70 | 1/15 |
| BSTN | 218 | 49 | 1/3 |
| BNN | 59 | 17 | 1 |
| LiNbO$_3$ | 31 | 9 | 2 |
| PLZT of epitaxial growth | 50 | 50 | 1 |

In the above table 1, numeral values relatively indicating the drive voltage in the optical switch of the present invention using SBN, BSTN or BNN are shown in the rightmost column, using the drive voltage in the conventional optical switch using PLZT of epitaxial growth which is the electro-optic material without polarization dependence, as the reference. Note, as data indicating the polarization dependence of each material, electro-optic constant $r_{33}$ (TM mode) and electro-optic constant $r_{13}$ (TE mode) are shown in the center columns. Further, data corresponding to LiNbO$_3$ which is a typical electro-optic material is also shown. From the date in table 1, it is understood that, in the case where SBN achieving the high electro-optic effect is used, the drive voltage can be reduced to about 1/15 compared with the drive voltage in the conventional optical switch, and therefore, the reduction effect of drive voltage is high. Further, in the case where BSTN is used, the drive voltage can be reduced to about 1/3. On the other hand, in the case where BNN is used, although the drive voltage is the same degree to that in the conventional optical switch using PLZT of epitaxial growth, the high electro-optic effect can be achieved compared with PLZT of epitaxial growth, and therefore, the larger deflection angle can be realized. Further, consideration is also made on the case where LiNbO$_3$ is used. Although it becomes possible to eliminate the polarization dependence of the deflection angle by applying the configuration of the present invention, the electro-optic effect is reduced compared with PLZT of epitaxial growth, and therefore, the drive voltage becomes high.

Incidentally, in the above embodiment, the configuration example has been shown in which the four input channel waveguides Cin1 to Cin4 and the four output channel waveguides Cout1 to Cout4 are provided. However, the number of input and output channel waveguides in the present invention is not limited to the above example, and the present invention is effective for an optical switch including at least one input channel waveguide and two or more output channel waveguides. In the case where a great number of input and output channel waveguides are provided, since the deflection angle in each of the first and second optical deflecting sections 30 and 50 needs to be made larger, the configuration of the present invention is especially effective.

Figure 4:
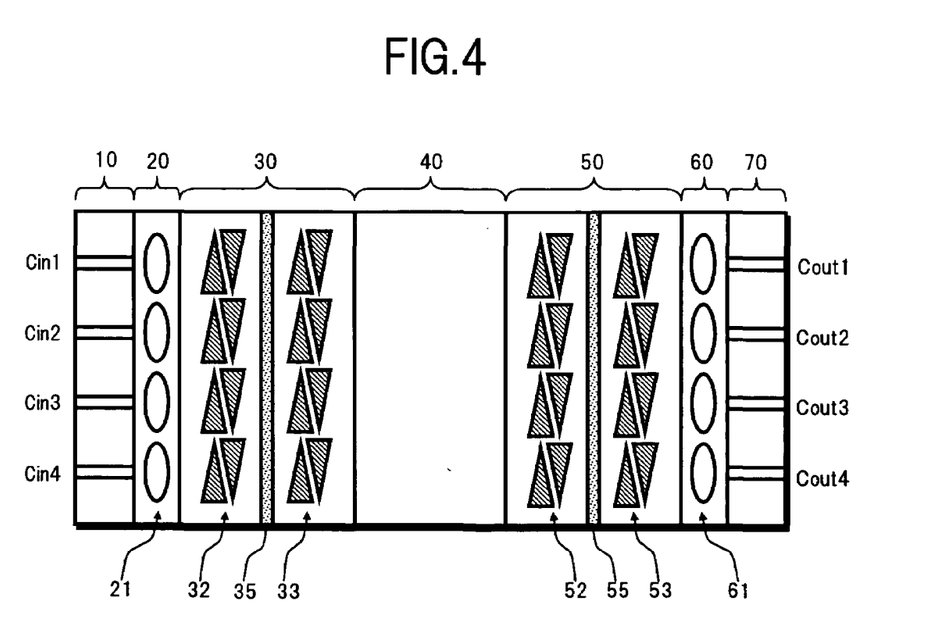
FIG. 4 is a top view showing another configuration relating to the embodiment.
Figure 5:
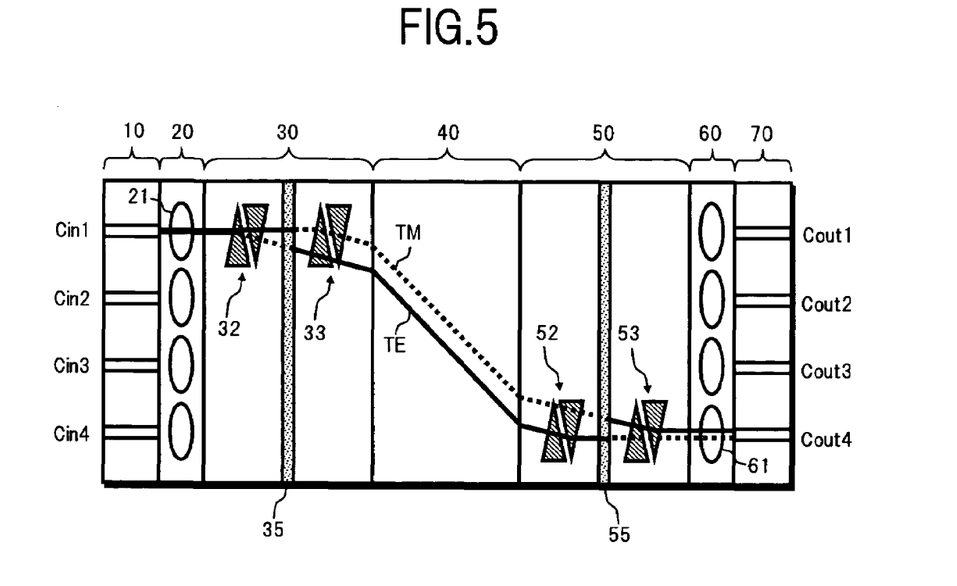
FIG. 5 is a diagram for explaining an operation of the configuration example in FIG. 4.

Further, in the above embodiment, the example has been shown in which the half-wave plate 41 is disposed on the center of the slab type optical waveguide section 40. However, as shown in FIG. 4 for example, it is also possible to consider a configuration in which the half-wave plate 41 is omitted. In this configuration, as shown in FIG. 5 for example, the light incident on the first optical deflecting section 30 in the TE mode (TM mode) is incident on the second optical deflecting section 50 in the TM mode (TE mode). Therefore, output positions of the respective lights of TE/TM modes passed through the second optical deflecting section 50 are not completely coincident with each other, and as a result, the deviation of several μm to several ten μm occurs. However, the deviation between the output positions of such a degree is less than the deviation between the output positions (refer to FIG. 8) in the case where the material having the high electro-optic effect similar to that in the present optical switch is used in the conventional configuration. Accordingly, although the loss of the light guided to the output channel waveguide is slightly degraded compared with the loss in the configuration in FIG. 1, such degradation is within a usable range as the optical switch. Namely, by the configuration shown in FIG. 4, the effect of reducing the polarization dependence of the deflection angle can also be achieved sufficiently. Note, the degradation of loss due to the deviation between the output positions as described above can be improved by using a multi-mode optical waveguide for each channel waveguide 71 of an optical output section 70.

What is claimed is:

1. An optical switch comprising:
   at least one input channel waveguide and a plurality of output channel waveguides;
   a first optical deflecting unit which deflects a light input to said input channel waveguide;
   a slab type optical waveguide unit through which the light deflected by said first optical deflecting unit is propagated; and
   a second optical deflecting unit which deflects the light passed through said slab type optical waveguide unit at a deflection angle symmetrical to that by said first optical deflecting unit, to guide the light to one output channel waveguide selected from said plurality of output channel waveguides,
   wherein said first optical deflecting unit and said second optical deflecting unit each includes:
   a slab type optical waveguide formed by using a material having a polarization dependence and an electro-optic effect;
   input side upper electrode portions each of which is formed with at least one prism type electrode on a position of the optical input side on the top surface of said slab type optical waveguide;
   output side upper electrode portions each of which is formed with at least one prism type electrode on a position of the optical output side on the top surface of said slab type optical waveguide;
   a lower electrode formed on the bottom surface of said slab type optical waveguide;
   a drive circuit which applies voltages to said input side upper electrode portions and said output side upper electrode portions, to generate substantially equal electric fields between said input side upper electrode portions and said lower electrode, and between said output side upper electrode portions and said lower electrode; and
   a mode conversion element which performs the inter-conversion between TE/TM modes of the light being propagated within said slab type optical waveguide positioned between said input side upper electrode portions and said output side upper electrode portions.

2. An optical switch according to claim 1,
   wherein said mode conversion element is a half-wave plate for rotating a polarization plane of the light by 90°.

3. An optical switch according to claim 2,
   wherein said half-wave plate is embedded in a groove formed to cross over said slab type optical waveguide.

4. An optical switch according to claim 1,
   wherein said slab type optical waveguide is formed by using SBN ($Sr_{0.75}Ba_{0.25}Nb_2O_6$).

5. An optical switch according to claim 1,
   wherein said slab type optical waveguide is formed by using BSTN ($Ba_{1-x}Sr_xTi_yNb_{2-y}O_6$).

6. An optical switch according to claim 1,
   wherein said slab type optical waveguide is formed by using BNN ($Ba_2NaNbO_5$).

7. An optical switch according to claim 1,
   wherein said slab type optical waveguide unit includes, on the center portion in a direction from said first optical deflecting unit toward said second optical deflecting unit, a mode conversion element which performs the inter-conversion between the TE/TM modes of the light being propagated through said center portion.

8. An optical switch according to claim 7,
   wherein said mode conversion element is a half-wave plate for rotating a polarization plane of the light by 90°.

9. An optical switch according to claim 8,
   wherein said half-wave plate is embedded in a groove formed to cross over said slab type optical waveguide unit.

10. An optical switch according to claim 1, further comprising:
    an optical input section made up by forming a plurality of input channel waveguides on an optical substrate;
    a collimate section including a plurality of collimate lenses each of which converts a light output from each of the input channel waveguides of said optical input section into a parallel light, to give the parallel light to said first optical deflecting unit;
    an optical output section made up by forming a plurality of output channel waveguides on an optical substrate; and
    an optical condensing section including a plurality of condenser lenses each of which condenses the light deflected by said second optical deflecting unit on one point, to give the light to one output channel waveguide selected from the output channel waveguides in said optical output section.

11. An optical switch according to claim 10,
    wherein each collimate lens of said collimate section consists of a thin-film lens formed on the optical substrate of said optical input section.

12. An optical switch according to claim 10,
    wherein each condenser lens of said optical condensing section consists of a thin-film lens formed on the optical substrate of said optical output section.

* * * * *